B. W. HASKELL & S. B. McCREA.
CAR FENDER.
APPLICATION FILED JUNE 20, 1910.

977,867.

Patented Dec. 6, 1910.

Witnesses

Inventors
BYRON W. HASKELL.
SAMUEL B. McCREA.
By
Attorney,

UNITED STATES PATENT OFFICE.

BYRON W. HASKELL AND SAMUEL B. McCREA, OF OAKLAND, CALIFORNIA.

CAR-FENDER.

977,867.   Specification of Letters Patent.   Patented Dec. 6, 1910.

Application filed June 20, 1910. Serial No. 567,994.

*To all whom it may concern:*

Be it known that we, BYRON W. HASKELL and SAMUEL B. MCCREA, citizens of the United States, residing at Oakland, in the county of Alameda and State of California, have invented certain new and useful Improvements in Car-Fenders, of which the following is a specification.

This invention relates to car fenders, and the principal object of the same is to provide simple means whereby mechanism is actuated by contact of the fender with an obstruction to cause said fender to pick-up the obstruction.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 2:
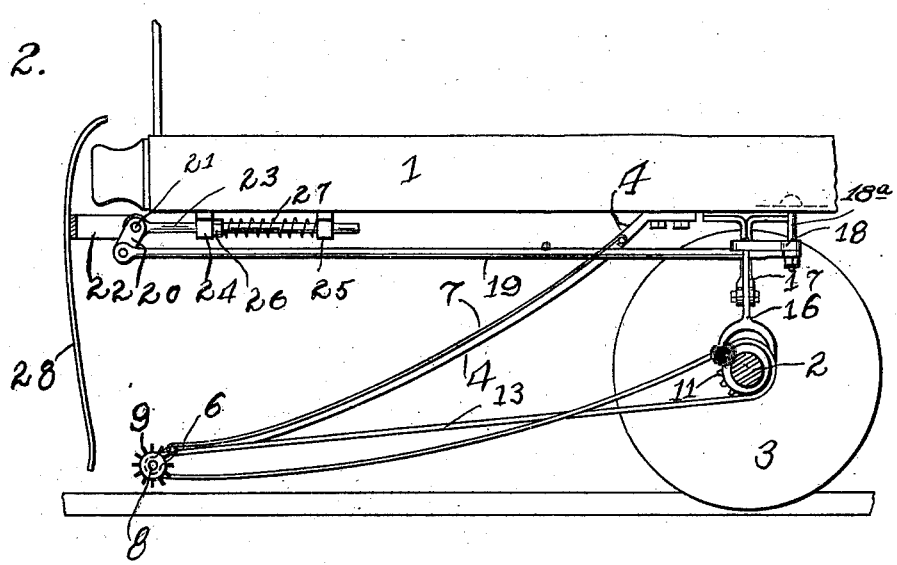
Figure 1:
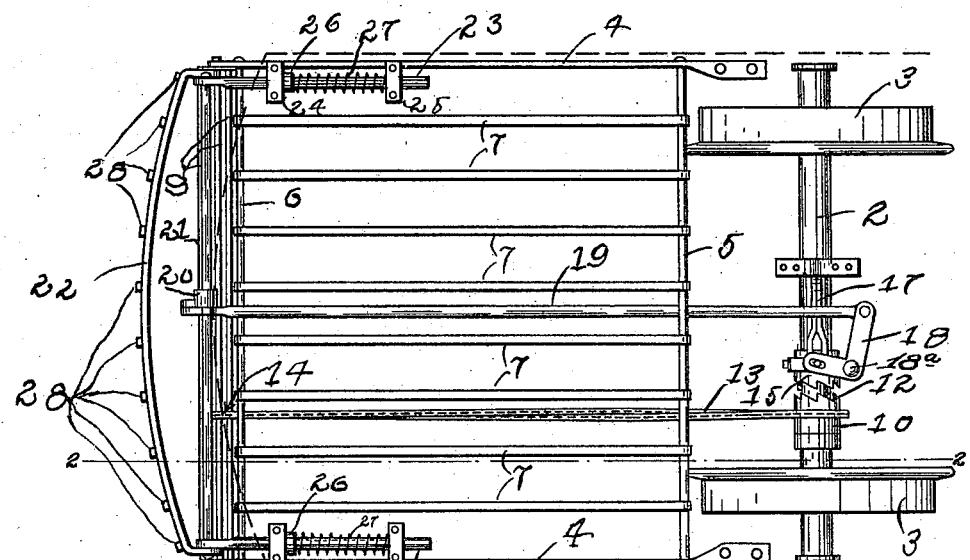

Figure 1 is a top plan view of the improved fender. Fig. 2 is a vertical sectional view taken on the line 2—2, Fig. 1, the fender being shown attached to a car platform.

Referring to the accompanying drawings by numerals, 1 designates the forward platform of a car to which the improved fender is attached. Said platform carries the usual axle 2 that is provided with the wheels 3.

The improved fender comprises a body that is formed of the stiff side members 4 the inner ends of which are flattened and suitably fastened to the under surface of the platform 1. The side members 4 are connected adjacent their upper ends by a transverse bar 5 and adjacent their lower ends by a similar bar 6. Said bars 5 and 6 are connected by the parallel resilient strips 7 which yield when the weight of the body is on them and form a pocket, in a manner well understood. The lower ends of side members 4 have the shaft 8 of a roller journaled therein. Said roller is preferably of rubber or other cushioning material and is provided with wings or ribs 9.

The axle 2 has the hub 10 of a sprocket 11 loose thereon, said hub having one end provided with clutch teeth 12. A chain 13 connects sprocket 11 with a similar sprocket 14 on shaft 8. A clutch 15 is splined to axle 2 and is moved longitudinally of said axle to engage the teeth 12 of hub 10 by means of a shifting lever 16 that is pivotally mounted in a hanger bracket 17 depending from platform 1. Shifting lever 16 is provided with a bell crank lever 18 which is pivotally mounted upon a bolt 18$^a$ one member of said bell crank lever having a rod connection 19 with a crank 20 that is rigidly secured to a transverse shaft 21 mounted in trip frame 22. Trip frame 22 is provided with rearwardly projecting arms 23 which are slidably supported in hanger bearings 24 and 25 carried by platform 1. Each arm is provided with a collar 26 that limits the sliding movement thereof in one direction and also serves as a bearing for one end of a spring 27, the other end of said spring bearing against the rear hanger 25. Said springs are coiled about the arms 23 and normally retain the trip frame projected beyond the forward end of platform 1. The trip frame 22 carries a plurality of vertically arranged spaced parallel guard strips 28 the lower ends of which project into the same plane as the resilient forward roller.

In use it will be seen that when an obstruction comes in contact with frame 22, the same will move toward the axle 2 against the tension of spring 27, which causes rod 19 to operate the shifting lever 16 so that the clutch will be locked to the hub 10. When in this position, it will be seen that the hub 10 rotates with the axle 2, and through the sprocket connection of the hub with the front roller, said roller is revolved to cause the wings 9 to engage the obstruction and roll the same into the fender. The chain 13 is crossed so that the forward roller will rotate in a direction to convey an obstruction to the fender and thereby prevent the obstruction being rolled over the surface in advance of the fender.

The vertically arranged guard strips are provided for contacting with an obstruction that might be lying on the tracks and when in contact with such an obstruction, will cause a rearward movement of the frame 22 that imparts a rotary movement to the forward roller. As will be clear, the frame 22 and strips 28 provide means whereby an obstruction in either a vertical or a horizontal position will cause the operating mechanism to rotate the forward roller, and said frame and strips also prevent obstructions coming in contact with the bumper or other forward position of the platform 1.

What we claim as our invention is:—

1. A car fender comprising a body carried by a car platform a rotatable pick-up carried by said body, mechanism carried by a car axle for operating said pick-up, a trip frame provided with arms that are slidably connected to said platform, means carried by said arms for projecting said frame forward, and means connected to said frame for operating said mechanism.

2. In a device of the character described the combination with a car platform, the axle thereof, and a fender carried by said platform, of a roller carried by the fender, a sprocket loose on the axle, a chain connection between said sprocket and roller, a clutch on said axle for locking the sprocket thereto, a trip frame slidably connected to said platform, a shaft carried thereby, a crank on said shaft, a connecting rod pivotally connected to said crank, a shifting lever pivotally connected to said platform and engaging the clutch, and a bell-crank lever carried by said shifting lever and pivotally connected to said connecting rod.

3. A car fender comprising a body carried by a car platform, a rotatable pick-up carried by said body, a mechanism carried by a car axle for operating said pick-up, a shifting lever attached at one end to said mechanism, a bar yieldingly suspended from a car platform, a link connecting said bar to said shifting lever and a trip frame connected to said bar and adapted to be pushed rearwardly to cause said shifting lever to operate said mechanism.

4. A car fender comprising a body carried by a car platform, a rotatable pick-up carried by said body, a toothed clutch loosely mounted upon a car axle, a sprocket chain connecting said clutch and said pick-up, a second toothed clutch slidably mounted upon a car axle, a fork pivotally suspended from a car platform and engaging said second-mentioned clutch, a bell-crank lever suspended from a car platform and attached to the upper end of said fork, an operating rod attached to one end of said bell-crank, and a trip frame connected with the other end of said rod and adapted to cause said rod to be thrust rearwardly to bring said second-mentioned clutch in connection with said first-mentioned clutch.

5. A car fender comprising a body carried by the car platform, a rotatable pick-up carried by said body, mechanism carried by the car axle for operating said pick-up, a shifting lever connected to one end of said mechanism, a bar at the front end of the car, a link connecting said shifting lever to said bar, rods mounted upon the ends of said bar, brackets suspending each of said rods from the car platform, a spring mounted upon each of said rods between said brackets and a trip frame attached to said bar.

In testimony whereof we affix our signatures in presence of two witnesses.

BYRON W. HASKELL.
SAMUEL B. McCREA.

Witnesses:
A. RABECHINJ,
K. C. SCHROEDER.